Feb. 13, 1962
C. B. FOSHEE ETAL
3,020,694
TREE CLEARING ATTACHMENT FOR TRACTOR
Filed Feb. 17, 1960
3 Sheets-Sheet 1
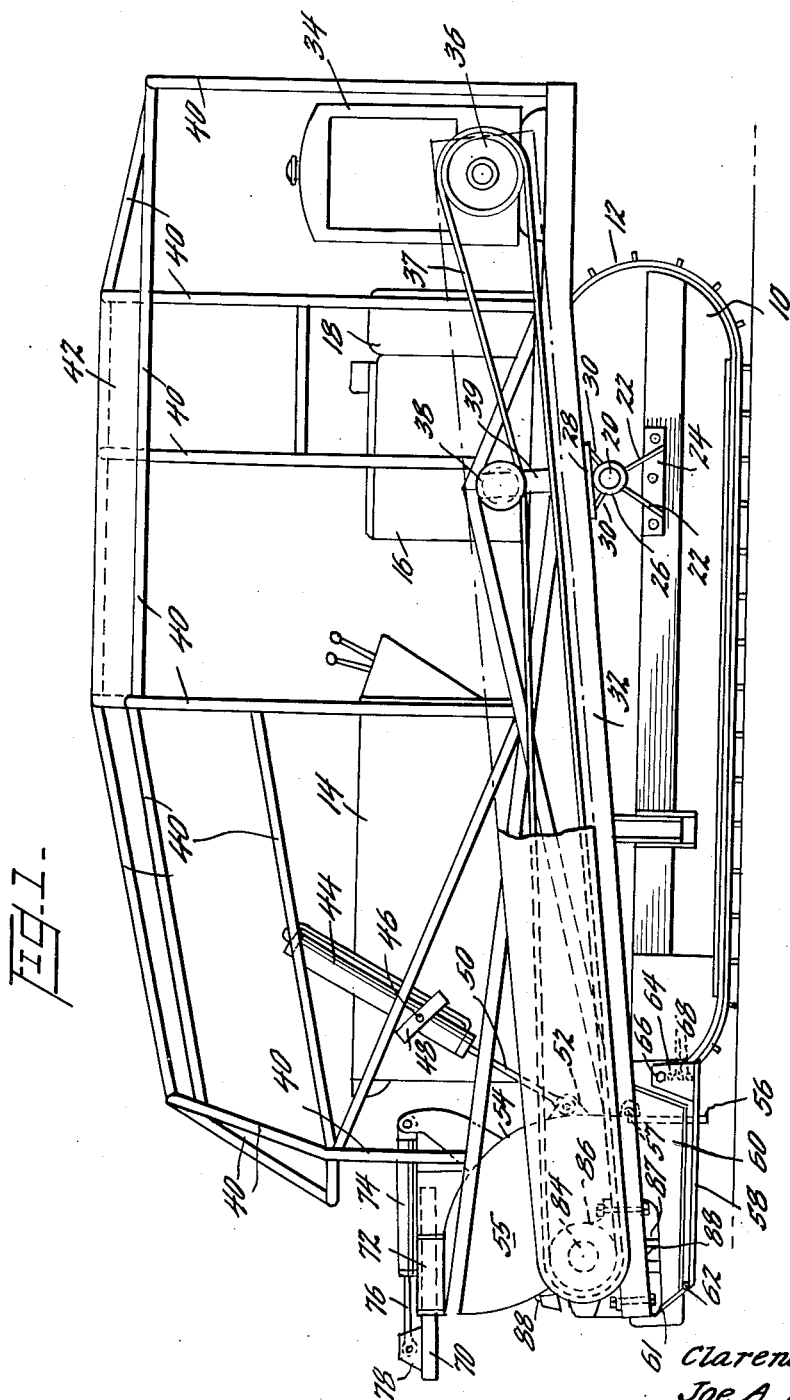
INVENTORS
Clarence B. Foshee
Joe A. McCauley
BY Parker and Walsh
ATTORNEYS

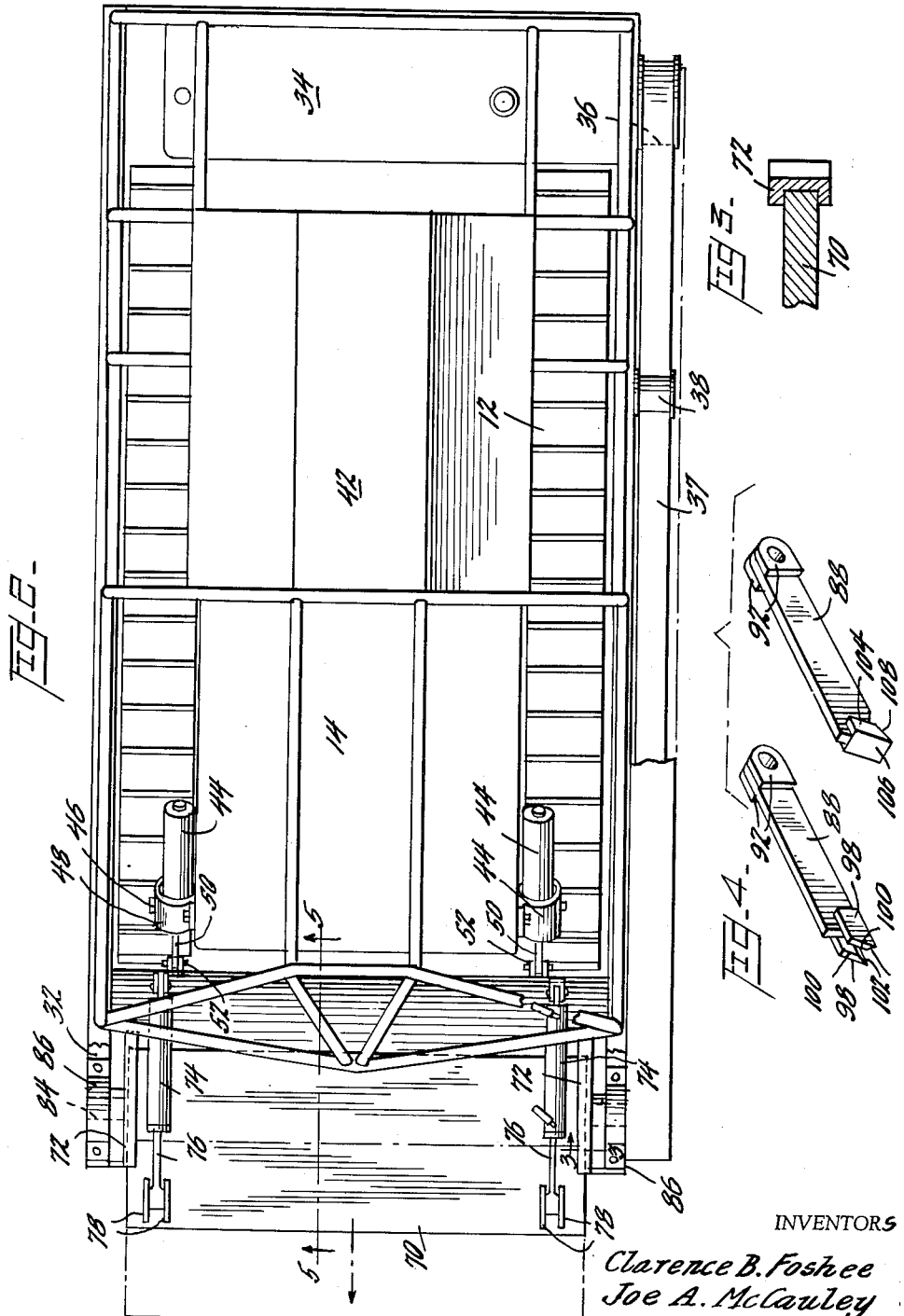

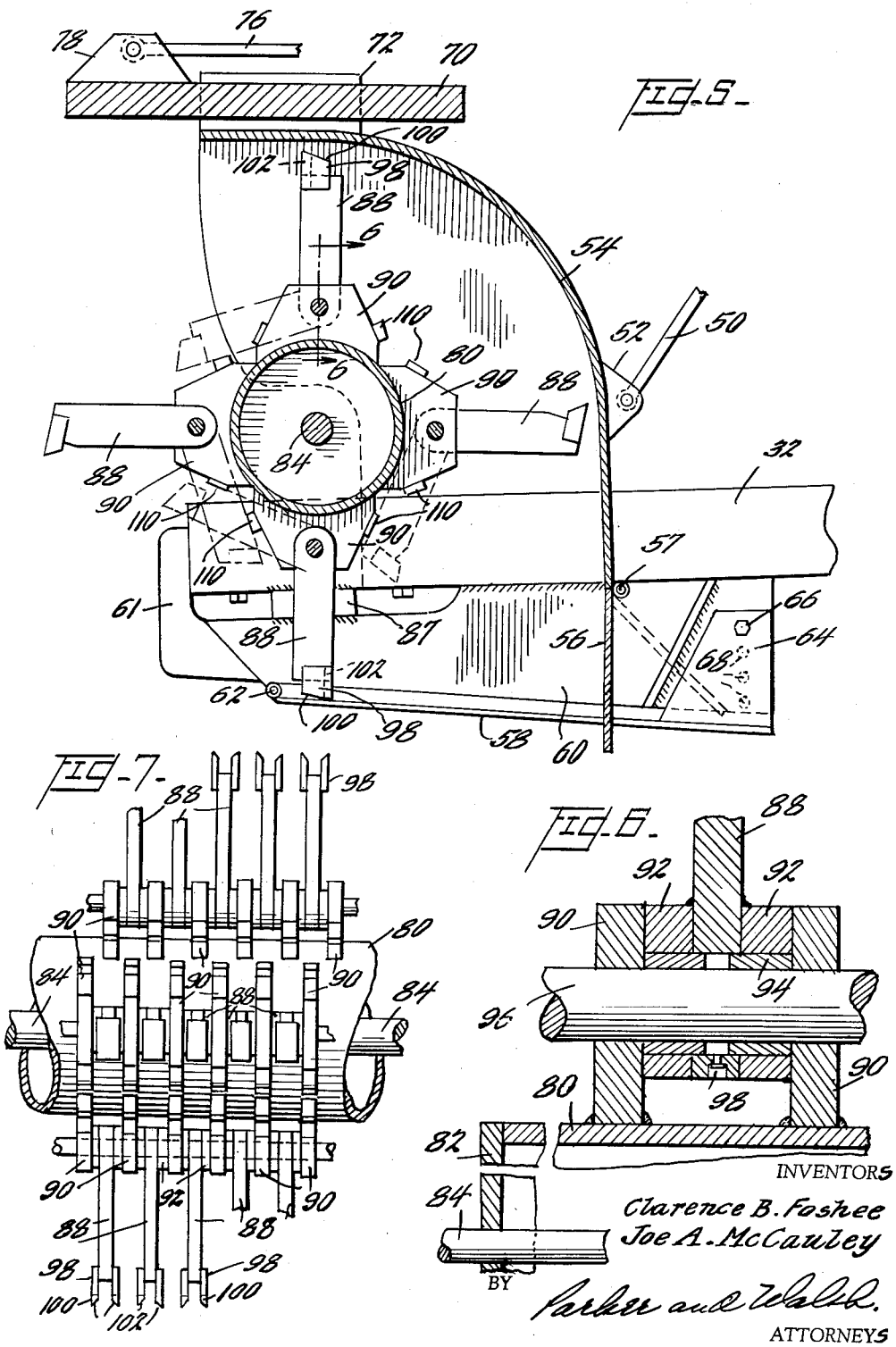

3,020,694
TREE CLEARING ATTACHMENT FOR TRACTOR
Clarence B. Foshee, 509 E. Main St., Gurdon, Ark., and
Joe A. McCauley, Okolona, Ark.
Filed Feb. 17, 1960, Ser. No. 9,215
16 Claims. (Cl. 56—26)

This invention relates to a tractor attachment for clearing land of trees, tree stumps, and other growth of a size and toughness beyond the capabilities of ordinary mowing implements.

It is an object of the invention to provide an attachment for ground vehicles, such as caterpillar tractors, which will cut a clean swath through wooded land by complete maceration of all obstacles to a substantial height above ground. In effect, this not only results in a cleared roadway for the carrying vehicle and others to follow, but also lays down a bed of mulched material with resultant benefit to the soil.

The foregoing and other objects are attained by our invention, which may be briefly described as a platform tiltably mounted on trunnions medially of the vehicle, carrying an auxiliary engine at its rear end with driving connection to a rotating drum at the front end having rigid cutting teeth articulated on its peripheral surface. Pursuant to the stated object of completely macerating the obstacles, the cutting teeth are arranged alternately in two forms, one designed for splitting the wood in vertical planes, and the following tooth designed for chipping out the sections between the splits. This presents a degree of efficiency in contradistinction to prior devices which merely beat or flailed the wood haphazardly, with reliance on brute force alone.

The invention, to be described in the specification to follow, is illustrated in the drawings, in which:

FIGURE 1 is a side elevational view of a caterpillar tractor with the clearing device mounted thereon;

FIGURE 2 is a top plan view of the device shown in FIGURE 1;

FIGURE 3 is a sectional view of a fragmental detail of the push bar slideway, taken on the line 3—3 of FIGURE 2;

FIGURE 4 is a bracketed view showing, in perspective, details of the two preferred types of cutting teeth;

FIGURE 5 is a sectional view through the cutter-carrying drum and associated parts, taken on the line 5—5 of FIGURE 2;

FIGURE 6 is a sectional view taken on the line 6—6 of FIGURE 5, showing the pivotal mounting of the cutter teeth arms; and FIGURE 7 is a fragmental view of the drum, in front elevation, showing details of the cutter teeth.

FIGURES 3 to 7 are drawn to a larger scale than FIGURES 1 and 2.

Referring to the drawings by characters of reference, there is shown, in FIGURE 1, a tractor vehicle 10 with endless tracks 12, engine compartment 14, driver's seat 16, and gas tank 18, all of which are conventional and per se form no part of the present invention.

The clearing device, which may be generally described as a four-sided frame lying outwardly of the four sides of the vehicle, is pivotally mounted on a pair of oppositely disposed trunnions 20 each carried by a pair of radially disposed plates 22, welded to a plate 24 which is bolted to a side panel of the frame of vehicle 10. The other portion of the pivotal connection comprises a bearing sleeve 26 fastened to a plate 28 through radially disposed plates 30, plate 28 being welded to a longitudinally disposed side beam 32 of the cutter assembly. Mounted on the extreme rear end of the cutter assembly frame is an auxiliary engine 34 with pulley 36 receiving a belt 37 which serves to drive the cutter drum at the front end of the frame. An adjustable idler, tensioning pulley 38 is mounted on an upright 39 on beam 32. A cage-form superstructure of tubular sections, all indicated by the numeral 40, serves as a protection to the operator against falling objects, and in the immediate vicinity of the driver's compartment, additional solid covering, such as panel 42 of plywood or the like, is provided, and this also serves as a shield from the rays of the sun.

The entire cutter assembly is tilted about trunnions 20 by means of a pair of hydraulic cylinders 44 pivoted on trunnions 46 received in a yoke 48 which is fixed to the housing of tractor engine 14. Piston rods 50 of the cylinders are each articulated at their outer ends to a pair of brackets 52 welded to a generally cylindrical hood 54 which has side plates 55 welded to side frame 32 of the tilting cage, and which hood serves to protect the driver and others by containing the flying debris, and conversely to protect the cutter unit itself from falling objects. Further protection against flying debris is achieved by a swinging gate 56 hinged to hood 54 as at 57, and running the full width of the hood.

The cutter assembly is intended to follow the contour of the ground with compensation provided in a swinging movement of the system about the trunnions 20, and to this end ground skids are provided in a pair of ski-like members 58 at the front ends of beams 32, being attached to plates 60 depending from the beams. Thin plates 61 extending forwardly of plates 60 serve as a protection. Location of skids 58 determines the working height of the cutters above the ground, and adjustability of this height, as well as variation in the angle presented by the skids to the terrain is accomplished by pivoting the skids by pins 62 to plates 60 and providing a rear, upstanding plate 64 on the skids, bored to receive a bolt 66 which may be selectively applied in any of a series of bores 68 in plates 60 arranged on a peripheral line with common radius about the center of pivot 62.

In the rocking movement of the cutter frame to follow the terrain in response to the contact of the skids, the hydraulic cylinders 44 will be inactivated, that is free-sliding, so that they will not oppose the action. However, it will be understood that the cutters may, if desired, be maintained at constant height above the ground by means of the hydraulic cylinders alone. This will be feasible where the ground is substantially level, and will serve to eliminate whatever resistance might arise in the use of the skids. If the swinging gate 56 is grounded prior to skid 58, it will drag along in a slightly swung position, but continue to function as a guard.

A pusher plate 70 for leading the cutters to condition the obstacles for attack by the cutters is provided atop the cutter hood 56, being slidable in a pair of generally horizontal channel guides 72 (FIGURE 3), and movable by a pair of hydraulic cylinders 74 with connecting rods 76 pivoted in brackets 78 carried on the top of plate 70. The pusher plate may be used in a fixed position, as adjusted by the hydraulic drivers, or it may be advanced during cutting, as conditions dictate, as where a quick impetus is needed to fell a tree forwardly, or where stubborn growth encountered requires a different degree of bending for efficient treatment.

The cutter unit proper comprises a hollow, cylindrical drum 80 (FIGURES 5, 6 and 7), with disc form end plates 82 carrying a shaft 84, the ends of which are journalled in pillow blocks 86 bolted to the front ends of side rails 32 of the tilting cage. In order to accommodate the bolts on the underside of the frame the skid-supporting plate 60 is cut away in part, and to compensate therefor a plate section 87 is welded in place in the center of the opening.

The arms 88 carrying the cutting tools are pivotally mounted on a series of brackets 90 in four rows on the periphery of the drum, equally spaced in an axial direction, the successive rows of brackets being spaced 90° apart. The distance between brackets along the rows is dictated by the width of the actual cutting tools, and since this is greater than the thickness of the cutter-carrying arms 88, the latter are provided with hub-like extensions or bosses 92 at their inner ends, this thickened portion being bored to receive a bearing sleeve 94 turning on a common pivot 96 running the length of each row of brackets. A conventional fitting 98 for lubricating the journal is fitted in each arm 88. The bosses 92 at the journalled ends of the cutter arms add stability and ruggedness to the system by reducing the stress on the pivot shaft 96 due to lateral forces on the swinging cutter arms.

A salient feature of my invention resides in the employment of two distinct types of cutting teeth, namely, splitting and chipping teeth. As best seen in FIGURE 4, the splitting, cutter unit comprises a pair of hardened plates 98, in the general aspect of an axe, each with an angularly disposed forward edge 100 and a knife-edge bevel 102 on its lower side. The chipping tool 104, which has the general shape and function of an adz, with a forward, sloping face 106 and a rake angle 108 on its lower face, is fixed in a rabbeted recess in the outer edge of its carrying arm 88.

The cutters should be arranged in such manner as to operate over the entire, lateral extent of the object encountered. This may be accomplished in more than one way, but it is important that each path of a splitting tooth should be followed substantially by a chipping tooth. In the embodiment shown (FIGURE 7), the brackets on the lower side of the drum and those extending forward from the drum are aligned, with the result that the chipper teeth in the latter will follow in identical paths to the splitting teeth in the former, so that their functions are fully realized. In order to contact the work in regions missed by the two rows just mentioned, the row of brackets at the top of the drum are staggered one-half the distance between the centers of the front and bottom brackets. These are provided with splitting teeth, and the following row of brackets (not shown) at the rear of the drum will be peripherally aligned with the top brackets and be provided with chipping teeth.

The cutting tooth arms are freely swingable through a considerable angle, and while in operation are kept in their circular path by centrifugal force only, thus avoiding a rigid construction which would be highly vulnerable to sudden and unusually resisting material. When stopped, starting up, or slowing down, the arms will not extend radially out but tend to fall against the drum, and for this reason, stop blocks 110 are provided on the brackets to receive the shock of the falling arms.

While a certain, preferred embodiment of the invention has been shown and described, the invention is not to be considered as strictly limited thereby, since various modifications and reasonable equivalents may suggest themselves to those skilled in the art in the light of this disclosure, and we do not wish, therefore to be limited except as shall appear from the spirit and scope of the appended claims.

We claim:

1. A device for clearing land of growth comprising a frame, means to tiltably mount the frame medially of its length, power means on one end of said frame, and cutter means on the other end of said frame, with a driving connection from said power means, said cutter means comprising a drum rotatably mounted on said frame, brackets arranged on the periphery of said drum, and rigid arms articulated in said brackets and having cutting teeth at their distal ends, said teeth comprising splitting teeth with sharp working edges in planes normal to the axis of said drum, and chipping teeth with sharp working edges parallel to the axis of said drum, said splitting teeth and chipping teeth being arranged in pairs peripherally of said drum so as to follow a common path.

2. A device for clearing land of growth comprising a frame, means to tiltably mount the frame medially of its length, power means on one end of said frame, and cutter means on the other end of said frame, with a driving connection from said power means, said cutter means comprising a drum rotatably mounted on said frame and rotatable in a sense to approach the ground on its side remote from the power means, brackets arranged on the periphery of said drum, and rigid arms articulated in said brackets and having cutting teeth at their distal ends, said teeth comprising splitting teeth with sharp, working edges in planes normal to the axis of said drum, and chipping teeth with sharp working edges parallel to the axis of said drum, said splitting teeth and chipping teeth being arranged in pairs peripherally of said drum so as to follow a common path.

3. A device for clearing land of growth comprising a frame, means to tiltably mount the frame medially of its length, power means on one end of said frame, and cutter means on the other end of said frame, with a driving connection from said power means, said cutter means comprising a drum rotatably mounted on said frame, brackets arranged on the periphery of said drum, and rigid arms articulated in said brackets and having cutting teeth at their distal ends, said teeth comprising splitting teeth in plural on an arm, arranged in spaced relation, and having sharp working edges in planes normal to the axis of said drum, and chipping teeth with sharp working edges parallel to the axis of said drum, said splitting teeth and chipping teeth being arranged in pairs peripherally of said drum so as to follow a common path.

4. A device for clearing land of growth comprising a frame, means to tiltably mount the frame medially of its length, power means on one end of said frame, and cutter means on the other end of said frame, with a driving connection from said power means, said cutter means comprising a drum rotatably mounted on said frame, brackets arranged on the periphery of said drum, and rigid arms articulated in said brackets and having cutting teeth at their distal ends, said teeth comprising splitting teeth in plural on an arm arranged in spaced relation, and having sharp, working edges in planes normal to the axis of said drum, and chipping teeth with sharp, working edges parallel to the axis of said drum, said pairs of splitting teeth and said chipping teeth having overall widths comparable in extent, and being arranged in following relation peripherally of said drum whereby to trace out a common path.

5. A device for clearing land of growth comprising a frame, means to tiltably mount the frame medially of its length, power means on one end of said frame, and cutter means on the other end of said frame, with a driving connection from said power means, said cutter means comprising a drum rotatably mounted on said frame, brackets arranged on the periphery of said drum, and rigid arms articulated in said brackets and having cutting teeth at their distal ends, said teeth comprising splitting teeth in plural on an arm arranged in spaced relation, and having sharp working edges in planes normal to the axis of said drum, and chipping teeth with sharp, working edges parallel to the axis of said drum, said pairs of splitting teeth and said chipping teeth having overall widths comparable in extent, arranged in following relation in a plurality of circular series peripherally of said drum whereby to trace out a common path, and said circular series being in such spaced relation as to provide continuity of cutting path axially of the drum.

6. A device for clearing land of growth comprising a frame, means to tiltably mount the frame medially of its length, power means on one end of said frame, and cutter means on the other end of said frame, with a driving connection from said power means, said cutter means comprising a drum rotatably mounted on said frame, brackets arranged on the periphery of said drum, rigid arms articulated in said brackets and having cutting teeth at their distal ends, said teeth comprising splitting teeth in plural on an arm, arranged in spaced relation, and having sharp working edges in planes normal to the axis of said drum, and chipping teeth with sharp working edges parallel to the axis of said drum, said pairs of splitting teeth and said chipping teeth having overall widths comparable in extent and arranged in following relation peripherally of said drum whereby to trace out a common, cutting path, and a cylindrical hood carried by said frame and enveloping the rear and top of said drum.

7. In a device as in claim 6, a pair of slide ways mounted on top of said hood, a pusher plate slidably mounted in said ways for movement forwardly of said drum, and power means to move said pusher plate.

8. A device as in claim 6, said hood comprising a swinging panel hinged to its lower portion behind the drum.

9. A device for clearing land of growth comprising a frame, means to tiltably mount the frame medially of its length, power means on one end of said frame, and cutter means on the other end of said frame, with a driving connection from said power means, said cutter means comprising a drum rotatably mounted on said frame, brackets arranged on the periphery of said drum, rigid arms articulated in said brackets and having cutting teeth at their distal ends, said teeth comprising splitting teeth and chipping teeth arranged in following relation in a common path peripherally of said drum, and ground-engaging skid means on said frame underlying said drum.

10. A device for clearing land of growth comprising a frame, means to tiltably mount the frame medially of its length, power means on one end of said frame, and cutter means on the other end of said frame, with a driving connection from said power means, said cutter means comprising a drum rotatably mounted on said frame, brackets arranged on the periphery of said drum, rigid arms articulated in said brackets and having cutting teeth at their distal ends, said teeth comprising splitting teeth and chipping teeth arranged in following relation in a common path peripherally of said drum, ground-engaging skid means on said frame underlying said drum, said skid means being pivoted at its forward end and having, at its rear end, means to adjust its inclination with respect to the ground.

11. For use in a ground clearing attachment, a cutter assembly comprising a drum, brackets fixed to the surface of said drum, and cutters pivoted in said brackets, said cutters comprising rigid arms with cutting tools fixed on their distal ends, said cutting tools comprising a splitting tool with an axe-like edge and a chipping tool with an adz-like edge.

12. For use in a ground-clearing device, a cutting unit comprising a drum, brackets carried on the periphery of said drum, rigid arms pivoted in said brackets, and cutting tools on the distal ends of said arms, said tools comprising a splitting tooth with an axe-like edge in a plane normal to the drum axis, and a chipping tooth with an adz-like edge parallel to the drum axis.

13. For use in a ground-clearing device, a cutting unit comprising a drum, brackets carried on the periphery of said drum, rigid arms pivoted in said brackets, and cutting tools on the distal ends of said arms, said tools comprising a splitting tooth with an axe-like edge in a plane normal to the drum axis, and a chipping tooth with an adz-like edge parallel to the drum axis, said splitting teeth and said chipping teeth being arranged in following relation in a common circular path peripherally of said drum.

14. For use in a ground-clearing device, a cutting unit comprising a drum, brackets carried on the periphery of said drum, rigid arms pivoted in said brackets, and cutting tools on the distal ends of said arms, said tools comprising splitting teeth with axe-like edges parallel to the drum axis, and chipping teeth with adz-like edges parallel to the drum axis, said splitting teeth and said chipping teeth being aranged in following relation in common circular paths peripherally of said drum, and said circular paths defining a substantially continuous, cylindrical surface.

15. For use in a ground-clearing device, a cutting unit comprising a drum, brackets carried on the periphery of said drum, rigid arms pivoted in said brackets, and cutting tools on the distal ends of said arms, said tools comprising splitting teeth in plurality with axe-like edges parallel to the drum axis, and chipping teeth with adz-like edges parallel to the drum axis, said splitting teeth on each arm having an over-all width, as a group, comparable to the width of said chipping teeth, and said splitting teeth and said chipping teeth being arranged in following relation in common circular paths peripherally of the drum.

16. For use in a ground-clearing device, a cutting unit comprising a drum, brackets carried on the periphery of said drum, rigid arms pivoted in said brackets, and cutting tools on the distal ends of said arms, said tools comprising splitting teeth in plurality with axe-like edges parallel to the drum axis, and chipping teeth with adz-like edges parallel to the drum axis, said splitting teeth on each arm having an over-all width, as a group, comparable to the width of said chipping teeth, said splitting teeth and said chipping teeth being arranged in following relation in common circular paths peripherally of the drum, and said brackets so arranged that said circular paths, collectively, define a substantially continuous cylindrical cutting path.

References Cited in the file of this patent

UNITED STATES PATENTS

| | | |
|---|---|---|
| 2,520,488 | Batchelder | Aug. 29, 1950 |
| 2,542,952 | White | Feb. 20, 1951 |
| 2,620,613 | Bradley | Dec. 9, 1952 |
| 2,691,262 | Swertferger | Oct. 12, 1954 |
| 2,745,331 | Lancour | May 15, 1956 |
| 2,836,023 | Caldwell | May 27, 1958 |
| 2,941,347 | Strom | June 21, 1960 |